United States Patent [19]
Kerfoot et al.

[11] 4,391,137
[45] Jul. 5, 1983

[54] GROUNDWATER FLOW METER

[75] Inventors: William B. Kerfoot, Falmouth; Stuart M. Skinner, Jr., Marion, both of Mass.

[73] Assignee: K-V Associates, Inc., Falmouth, Mass.

[21] Appl. No.: 276,787

[22] Filed: Jun. 24, 1981

[30] Foreign Application Priority Data

Jun. 28, 1980 [DE] Fed. Rep. of Germany ....... 3024417

[51] Int. Cl.³ .............................................. G01F 1/68
[52] U.S. Cl. ..................................................... 73/204
[58] Field of Search ................. 73/188, 189, 204, 154

[56] References Cited
U.S. PATENT DOCUMENTS 2,981,104  4/1961  Auger et al. ........................... 73/189
3,359,794  12/1967  Rosenberg ............................. 73/189
3,995,480  12/1976  Edgerton .............................. 73/188

FOREIGN PATENT DOCUMENTS 45-23318  8/1970  Japan ..................................... 73/204

Primary Examiner—Herbert Goldstein
Attorney, Agent, or Firm—Diller, Ramik & Wight

[57] ABSTRACT

Flow characteristics of a fluid through a permeable solid medium are determined by introducing a predetermined quantity of thermal energy at a highly localized point within the medium and subsequently mapping temperatures around such point to determine the direction and rate of fluid flow through the medium.

20 Claims, 6 Drawing Figures

GROUNDWATER FLOW METER

BACKGROUND OF THE INVENTION

Although this invention is directed principally to the measurement of direction and/or rate of groundwater flow in order to determine the environmental effect, for example, of septic leachate upon natural water systems, the basic principles of this invention are applicable to a wide range of problems in which the velocity and/or direction of fluid flow is in question.

At present, many systems and techniques have been developed to provide information about the direction and/or rate of a fluid flow, including systems which rely on steady state heating a tube through which a liquid flows and measuring temperatures of the moving liquid at upstream and downstream locations relative to the heat source, to obtain a hyperbolic measurement of flow rate. However, none has to my knowledge been developed which involves measurement of the distortion of a thermal field established by locally heating a permeable mass through which the fluid flows, to obtain a linear measurement of fluid flow rate.

BRIEF SUMMARY OF THE INVENTION

This invention relates to the discovery that the distortion of a thermal field established in a porous medium through which a very slowly flowing groundwater system moves, can be used to provide a linear measurement of the rate of such groundwater flow. More specifically, it was found that if temperature measurements are made at different regions of the distorted field, so as in effect to "map" it, not only can the flow azimuth be determined, but also the rate of flow can be determined.

In a basic arrangement, the thermal field is established by transferring a predetermined quantity of heat energy to a highly localized region of a porous heat conductive medium through which the groundwater flows. The localized region is at the center of a surrounding array of temperature sensors. By noting the temperature change differential between diametrically opposed pairs of sensors, the pair indicating the greatest such differential provides information concerning the direction of flow whereas the amplitude of the differential provides a linear indication of the rate of flow.

In such system, the heat source was "pulsed" whereafter the maximum temperature differentials between the pairs of the sensors were recorded. It was discovered that over a wide range of groundwater flow velocities, the temperature differentials peaked after the same elapsed time subsequent to cessation of the heat "pulse", and that the variation in maximum temperature differential in the direction of flow, was essentially linearly related to groundwater flow rate of velocity.

BRIEF DESCRIPTION OF THE DRAWING FIGURES

DETAILED DESCRIPTION OF THE INVENTION

Figure 1:
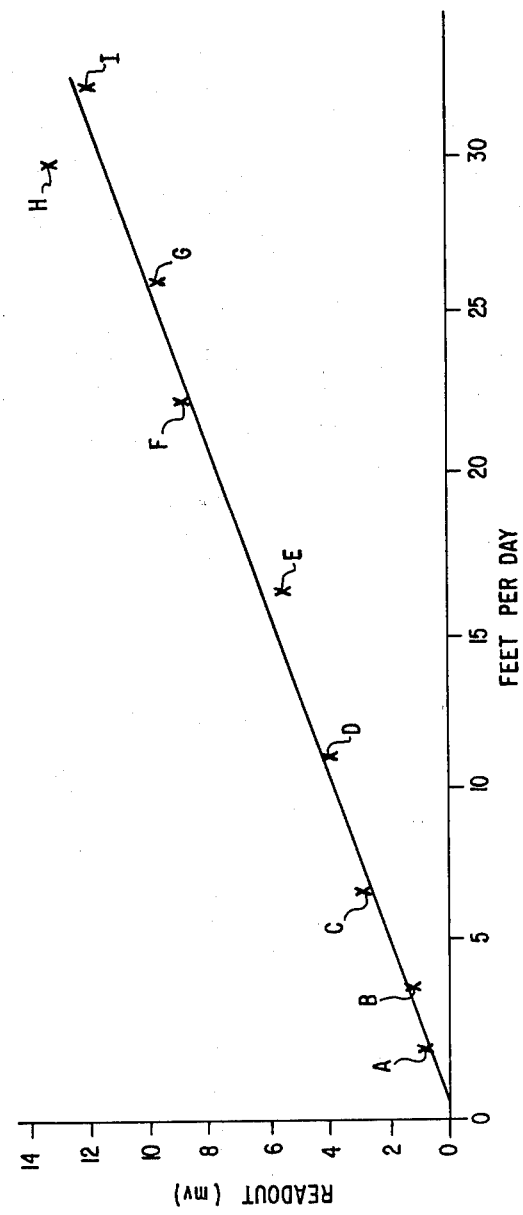
FIG. 1 is a schematic diagram illustrating certain basic features of the invention.

Referring more particularly to FIG. 1, certain principles of the present invention will be apparent therefrom. As illustrated, a pair of temperature sensing means 10 and 12 and which in the specific construction illustrated take the form of thermistors, are arrayed on opposite sides of a heating element indicated generally by the reference character 14. It will be understood that the sensing means 10 and 12 as well as the heater 14 are to be disposed within a porous heat conductive medium M through which the fluid whose flow characteristics are being measured, flows. In the groundwater system, the porous medium can be the soil itself, in which case the naked heater and sensor may be inserted thereinto. However, the sensing means and the heater are preferably embedded in a porous or permeable mass to provide a probe element to assure uniform and accurate heat conductivity. When such an arrangement is used, the porous mass should be formed of substantially uniformly sized spherical particles having heat conductivity substantially greater than that of the fluid whose flow is being measured, the particle size being not greater than about 1.0 mm in diameter and sufficiently large as will not impede, distort or adversely affect the normal groundwater flow.

In any event, with the arrangement as shown, a timer indicated generally by the reference character 16 is actuated by suitable means not illustrated to energize the heater 14 from the power source 18 for a predetermined period of time. In this way, a predetermined quantity of thermal energy is introduced, the ammeter 20 being illustrated in the line connection to the heater 14 to illustrate this fact, i.e., that the arrangement is such as to provide a control power input to the heater 14 such that the heater dissipates a predetermined quantity of heat conductive medium during a predetermined period of time controlled by the timer 16.

In this fashion, the heater 14 is "pulsed" to heat the porous mass M and establish a thermal field within the flow path of the fluid whose flow characteristics are being measured. In the absence of fluid flow or movement, the field is centered about the location of the heater 14 and is symmetrical or of predetermined shape with respect thereto.

The two thermistors 10 and 12 are connected to a suitable source 22 and the two branches of the circuitry to the individual sensors 10 and 12 include, in addition to the variable resistance displayed by the sensors, the resistors 24 and 26 respectively and a common variable resistance element 28 suitably grounded as shown to connect the opposite side of the supply 22. The two resistors 24 and 26 are of equal value and the resistor 28 is variable to establish a calibrated set point or zero at the volt meter 30 at some predetermined temperature of the two thermistors 10 and 12.

The aforementioned thermal field, in the presence of fluid movement or flow, will be distorted and the deviation represented thereby will, dependent upon the direction of flow, differentialy affect the two thermistors 10 and 12. For example, if the flow of the fluid is horizontally to the right in FIG. 1, the temperature experienced at and measured by the thermistor 12 will be higher than the temperature sensed at 10 and this temperature differential is measured by the volt meter 30 as will be readily apparent. Thus, in effect, the distortion of the thermal field established by the heater 14 is mapped by the sensing means 10 and 12, with the amplitude of the voltage reading at the meter 30 being indicative of the degree of deviation or distortion of the thermal field. We have found that the differential reading measured at 30 between sensing means diametrically located with respect to each other on opposite sides of the location of the heater 14 from which the thermal field emanates and wherein this diametrical orientation is aligned with the direction of fluid flow, is substantially linearly related to the flow velocity of the fluid. This is illustrated in FIG 2, the ordinate representing the temperature differential betweein paired thermistors oriented along the direction of flow for various calculated rates of fluid flow through a porous, permeable medium.

Figure 5:
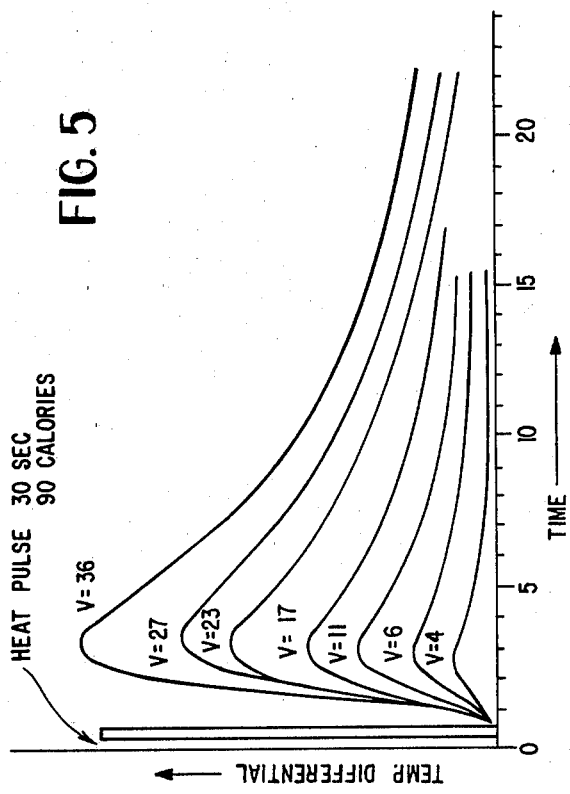
FIG. 5 is a graph illustrating certain properties of the invention.
Figure 2:
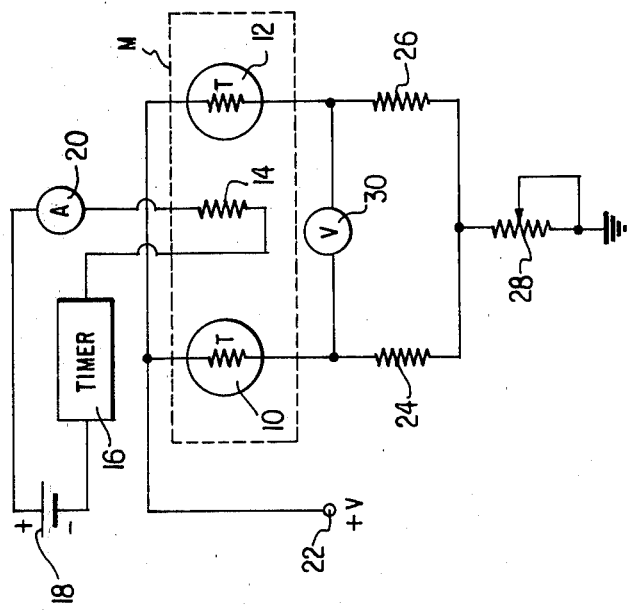
FIG. 2 is a graph illustrating the linearity between maximum temperature differential and fluid flow rate.

FIG. 5 illustrates another relationship which obtains at the low groundwater velocities noted in FIG. 2, namely, that the peak temperature differential and, hence, voltage differential between thermistors aligned along the direction of flow as aforesaid occurs approximately three minutes subsequent to initiation of the heat pulse at the heater 14, irrespective of the flow rate within the range depicted.

Figure 3:
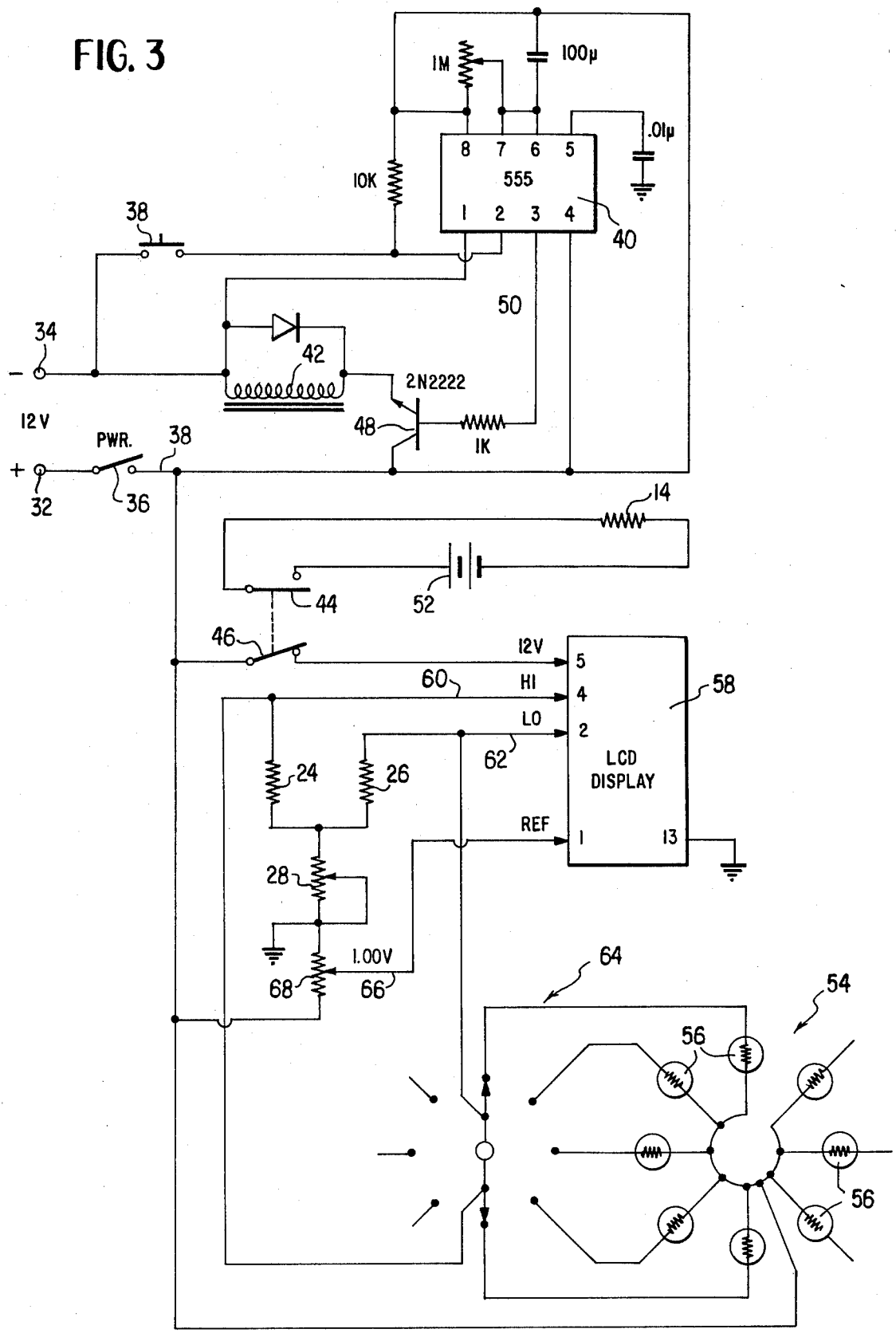
FIG. 3 is a schematic illustrating one embodiment of the invention.

FIG. 3 illustrates a practical embodiment of the present invention and shows a somewhat more detailed electrical circuit arrangement following the principles illustrated in FIG. 1. In FIG. 3, a suitable source of external voltage is indicated at 32, 34 with the positive side 32 being connected through a manually operated power on/or switch 36 to the main input line 38. The negative side 34 of the source is connected through a manual pushbutton 38 as an input to the standard 555 type timer indicated generally by the reference 40 so that when the switch 38 is depressed, the timer actuates the constant power circuit for a set period of 30 seconds. In the embodiment of FIG. 3, operation of the timer 40 causes the relay coil 42 to be energized correspondingly to actuate the two switches 44 and 46 thereof, the circuit through the solenoid or relay coil 42 being completed through the NPN device indicated generally by the reference character 48. The device 48 is normally non-conducting but when the timer 555 is energized by depression of the pushbutton 38, the output at pin number 3 thereof, as indicated by the reference character 50, biases the transistor 48 on to allow the relay coil 42 to be energized for the period of time taken before the timer 40 times out. Since the type 555 timer is so well known, only the pin connections thereof are illustrated and the necessary external component connections thereto for providing a thirty second duration energization of the relay coil 42.

When the coil 42 is energized, the switch 44 completes the circuit through the heater 14, which may be provided with a suitable constant power source indicated by the battery 52. The constant power circuit supplies an electrical resistance heater 14 which corresponds to the similarly reference heater in FIG. 1, although shown for convenience in a separate position in FIG. 3, but which is actually disposed centrally with respect to the planar, circular array 54 of thermistor elements 56. After the heater has been energized for the period of time determined by the timer 40, the relay coil 52 is deenergized and the switches 44 and 46 return to the full line position shown in FIG. 3. In this position, the heater 14 is no longer energized and the switch 46 connects the main power line 38 to the appropriate source voltage input pin of the liquid crystal display device indicated generally by the reference character 58. The device 58 illustrated is a DATEL DIGITAL PANEL METER (1.999 V Model DS-3100U2I) with external span adjust capability provided by a 10K variable potentiometer.

The rotary switch 64 is employed to measure difference between the analog high and analog low inputs from diametrically opposed pairs of the thermistors 56 of the array 54, such being indicated by reference characters 60 and 62. The array 54 of sensors comprises a circular arrangement thereof about the common center whereat the heater 14 is located as previously mentioned, so that the diametrically opposed pairs of sensors provide, through the rotary switch 64, the respective high and low inputs at 60 and 62 as illustrated. The potentiometer 68 is provided so that its top 66 may be adjusted to provide the proper reference voltage input to the device 58.

Figure 6:
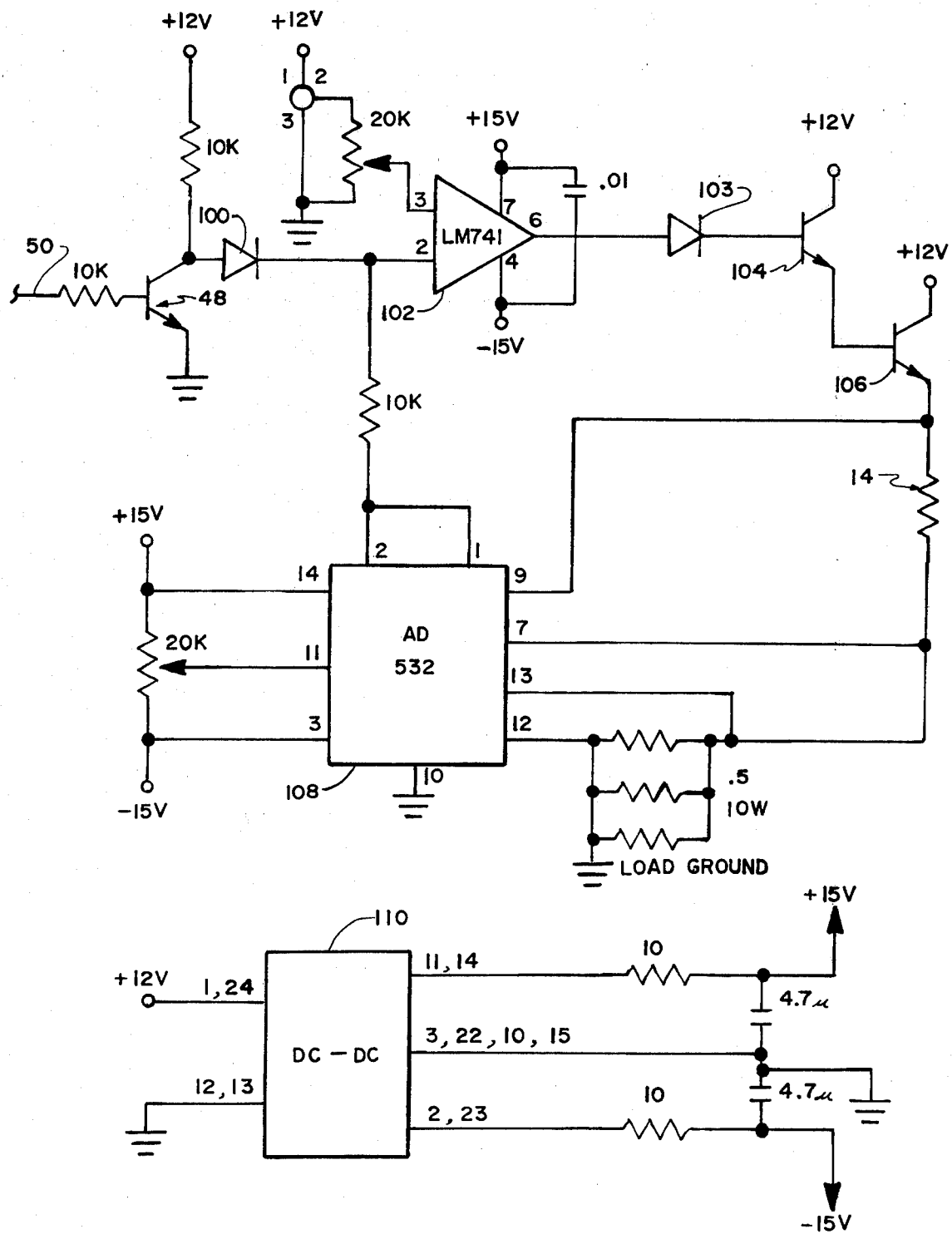
FIG. 6 is a circuit diagram showing a modified form of the control assembly.

FIG. 6 illustrates a solid state version of that portion of the electrical system of FIG. 3 which eliminates the relay 42, 44, 46 and provides a constant power source to replace the battery 52. As shown, a transistor 48 of the type used in FIG. 3 is retained and is used in conjunction with the diode 100 to eliminate the need for mechanical switching. The operational amplifier 102, diode 103, transistors 104 and 106 of types 1N1711 and MJ3001 respectively and connected as shown in Darlington array, and the multiplier 108 form a constant power source for the heater 14 when the timing circuit is actuated. The DC-DC converter 110 is provided to supply the voltages necessary for the devices 102 and 108. As noted, the circuit portion shown in FIG. 6 is illustrated merely to show that an all solid state arrangement may be preferable.

Figure 4:
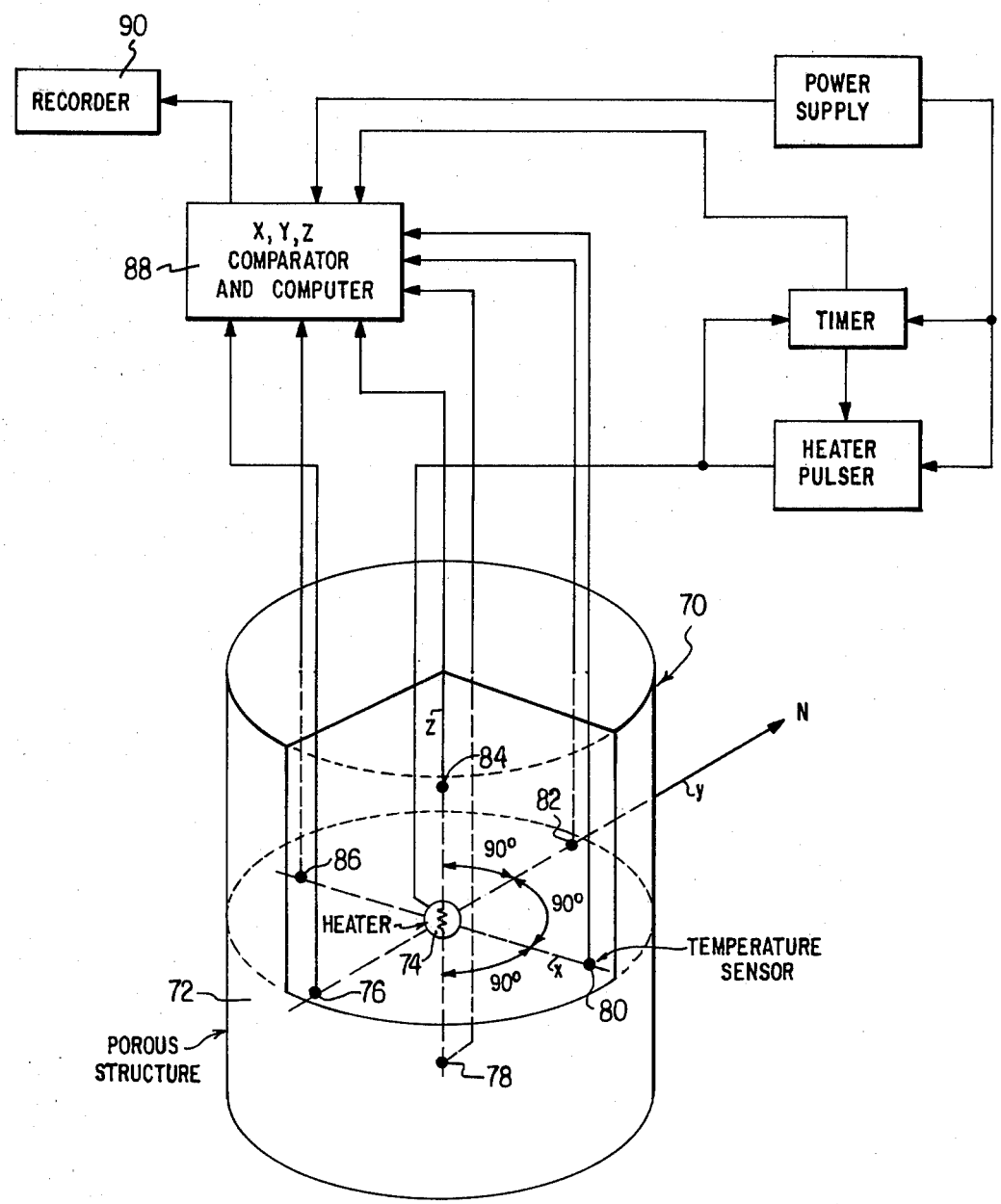
FIG. 4 is a schematic view illustrating one embodiment of a probe assembly and associated measuring circuitry.

FIG. 4 illustrates another form of the invention for measuring groundwater flow. A probe assembly which is indicated generally by the reference character 70 comprises a porous mass of particulate material indicated by the reference character 72, having a heat conductivity of at least 10 times that of water and, imbedded therein, are a heater element 74 and a surrounding array of sensors 76, 78, 80, 82, 84 and 86. The sensors 76, 80, 82 and 86 lie in a common plane and are disposed in diametrically opposed pairs whereas the sensors 76, 78, 82 and 84 lie in a second plane orthogonal to the first-mentioned plane and, again, arranged in diametrically opposed pairs and, lastly, the sensors 78, 80, 84 and 86 lie in a third, orthogonal plane whereby the heater element 74 lies at the center of the spherical surface upon which the various sensors lie. If, now, the line through the sensors 76 and 82 is oriented in the North direction as indicated, and the outputs of the various sensors are connected as inputs to an X, Y, Z comparator and computer 88, the precise direction of groundwater flow through the permeable structure 72 may be recorded by the mechanism 90 in accordance with well-known X, Y, Z resolution techniques. At the same time, the flow rate is computed by determination of the temperature differential between diametrically opposed points, in the horizontal plane containing the sensors 76, 80, 82 and 86, which are aligned with the flow direction.

The purpose of the porous structure 72 is not only accurately to position the sensors and heater and to provide the proper heat conductivity to produce the aforesaid thermal field but also to provide a probe which is useful in a variety of soils. For example, although the heaters and sensors may be arrayed directly in rather small grained soils to obtain accurate measurements of direction and flow velocity, large grain size soils may give inaccurate readings because of distortions to the thermal field caused by the soil particles themselves. Thus, the porous structure 72 consists of an agglomeration of similarly sized small particles through which the groundwater flows so as uniformly to affect the various sensors with respect to the thermal field generated by the heater 74.

The heater and sensor array can be inserted directly into the water saturated zone of fine gravel to fine sand soil to measure the rate and direction of groundwater flow or may be enclosed or encased in an end cap of porous spherical material of suitable permeability. Water moving through the irregular soil pores courses through the permeable substrate into which the sensing elements and heater are situated. The flow is laminar and continuous under normal groundwater flow conditions (V=30 ft. per day or less) flow through the porous end cap continues to be laminar without the formation of any boundary layers between probe and the water saturated natural soil into which the probe is immersed. No stagnation points exist, as in the case of fluid flow around nonporous probes. To sense the direction and rate of flow, the probe is first oriented towards magnetic North. Each opposing pair of sensors is nulled to zero or a stable difference recorded. As portrayed in FIG. 1, a heat pulse is released into the porous substrate and moves symmetrically outwards in all directions. The natural laminar flow of groundwater influences the thermal field in the porous solid, retarding the outward flow of heat at a maximum in the direction in which laminar flow directly opposes heat flow and augmenting the outward flow at a maximum in the direction of the laminar flow. Sensors lying perpendicular to the axis of flow would show no variation due to laminar flow, since the distortion of the thermal field moving through the solid matrix would remain equivalent for each.

The probe can be used in naturally porous soils from fine gravel to fine silty sand. As the particle size approaches that of medium gravel, the pathways of interstitial flow become too irregular to measure direction accurately. Similarly, variations in heat conductance through large particles (intra-particle conductance) dominate heat transfer between particles (inter-particle conductance), which leads to high variability in estimating flow rate. Thus, for measuring flow rates in gravel, it is essential that the array be embedded in the porous mass 72 as shown in FIG. 4, the mass 72 being composed of uniform spherical particles within the range of 1-0.1 mm diameter as long as the flow velocity through the gravel is not so high as to be excessively impeded by the permeability of the porous mass.

The vector field indicated by the amplitude of opposing pairs of heat sensors can provide additional information on the characteristics of groundwater flow apart from direction and rate of flow. For the first example, uniform horizontal flow occurs, all vectors will correspond to the cosine of the vector solution (or primary direction of flow). However, if the column of water is unstable vertically, the vectors will deviate from the cosine of the direction of principal flow.

Described mathematically by the function:

$$Y = a\cos x$$

where:
 $Y$ = the rate of flow in a direction (x)
 $a$ = the rate of flow in the principle direction of flow
 $x$ = the angle of deviation from the direction of main flow For a second example, if the water mass has an oscillating nature, moving back and forth with a period less than that for a reading, the heat flux field will describe the main components of that motion.

If the water mass has an oscillating nature with a period substantially greater than that of the time required for measurement, such as groundwater in coastal areas subjected to tidal action, successive recordings at appropriate intervals can be employed to describe the harmonics of the oscillatory motion.

Lastly, if an array of three probe units are inserted into shallow surface groundwater in a triangular arrangement, the units can be used to detect the position and approximate volume of displacement of a transient discharge of water or liquid occurring between or nearby the array. Continual recording of the independent probes can establish the background flow conditions of rate and direction. Any sudden addition of volume to the groundwater surface creates an outwards rush of shallow groundwater displacing the recorded principal direction of flow at the independent units in a direction emanating from that of the source of the displacement and proportional to the volume added. Detection is quite rapid, as the introduced mass of liquid need not reach the sensors, only the head differential due to the propagated displacement.

In addition to detecting a discharge, a triangular array can also be used surrounding a withdrawal well to assure movement within the boundary property. With either treatment of the withdrawn water or evaporation of the pumped water, the monitoring system can be used to isolate the local groundwater movement to form a flow cell so that no groundwater flow will leave the property.

What is claimed is:
1. The method of measuring a flow characteristic of a fluid, which comprises the steps of:
 (a) providing a heat conductive porous medium;
 (b) heating a localized region of said heat conductive porous medium through which fluid is flowing, the heat conductivity of the porous medium being substantially greater than the heat conductivity of the fluid; and
 (c) measuring the temperature of the medium at at least two regions spaced from said localized region and determining a flow characteristic of the fluid therefrom.

2. The method of measuring a flow characteristic of a fluid, which comprises the steps of:
 (a) heating a localized region of a heat conductive medium through which fluid is flowing, the heat conductivity of the medium being substantially greater than the heat conductivity of the fluid;
 (b) measuring the temperature of the medium at at least two regions spaced from said localized region and determining a flow characteristic of the fluid therefrom, and
the heating of step (a) is effected by heating the medium for a short period of time at said localized region and effecting step (b) subsequent to such heating.

3. The method as defined in claim 1 or 2 wherein the measurement step is made by temperature sensing means displaced from said location.

4. The method as defined in claim 3 wherein said temperature sensing means are arranged in an array surrounding said location.

5. The method as defined in claim 1 or 2 wherein the measurement step is a peak temperature measurement.

6. The method of measuring flow characteristics of a fluid, which comprises the steps of:
   (a) establishing a thermal field in a porous medium disposed within the fluid under test, the heat conductivity of the medium being at least 10 times greater than the heat conductivity of the fluid;
   (b) measuring temperature peaks within different regions of the thermal field; and
   (c) determining a flow characteristic of the fluid from the measurements of step (b).

7. The method as defined in claim 6 wherein the flow characteristic determined in step (c) is flow direction.

8. The method as defined in claim 6 wherein the flow characteristic determined in step (c) is flow velocity.

9. The method as defined in claim 6 wherein both flow direction and flow velocity are determined in step (c).

10. Apparatus as defined in claim 9 wherein said first means comprises a heater and circuitry for energizing said heater for a predetermined time.

11. Apparatus as defined in claim 9 wherein said first means comprises a heater and said second means comprises a plurality of temperature sensors arrayed symmetrically with respect to said heater.

12. The method of measuring the direction of flow of a fluid, which comprises the steps of:
    (a) positioning a porous medium in the flowing fluid, said medium having an array of temperature sensors therein and having heat conductivity much greater than that of the fluid;
    (b) heating the medium for a short period of time at a localized position spaced from said sensors;
    (c) measuring the temperature peaks at said sensors due to the heat applied in step (a) subsequent to cessation of the heating of step (b); and
    (d) determining the direction of fluid flow from the measurements of step (c).

13. Apparatus as defined in claim 9 or 12 wherein said second means comprises an array of temperature sensors disposed within said medium.

14. Apparatus according to claim 13 wherein said second means also includes means for determining peak temperature differentials between certain pairs of said sensors.

15. The method of measuring the direction and rate of flow of a fluid, which comprises the steps of:
    (a) positioning a porous medium in the flowing fluid, said medium having an array of temperature sensors therein and having heat conductivity much greater than that of the fluid;
    (b) heating the medium for a short period of time at a localized position spaced from said sensors;
    (c) measuring the temperature peaks at said sensors due to the heat applied in step (b) subsequent to cessation of the heating of step (b); and
    (d) determining the direction and rate of flow of the fluid from the measurements of step (c).

16. The method of measuring the rate of flow if a fluid, which comprises the steps of:
    (a) positioning a porous medium in the flowing fluid, said medium having a pair of temperature sensors therein which are spaced apart in the direction of flow of the fluid whose flow rate is to be measured and having heat conductivity much greater than that of the fluid;
    (b) heating the medium for a short period of time at a localized position spaced between said temperature sensors;
    (c) measuring the peak temperature differential between said sensors due to the heat applied in step (b) subsequent to cessation of the heating of step (b); and
    (d) determining the rate of fluid flow from the measurement of step (c).

17. Apparatus as defined in claim 16 wherein said first means comprises a heater and circuitry for energizing said heater for a predetermined time.

18. Apparatus according to claim 11 or 17 wherein said second means also includes means for determining peak temperature differentials between certain pairs of said sensors.

19. The method of obtaining a linear measurement of capillary groundwater flow which comprises the steps of:
    (a) providing a porous mass composed of uniform spherical particles having a diameter within the range of 0.1–1.0 mm and a heat conductivity of at least 10 times that of water and having an array of heat sensors embedded therein and a heating source centrally disposed among said sensors;
    (b) embedding the porous mass within the ground so as to be exposed to groundwater flow;
    (c) energizing said source for a predetermined time;
    (d) measuring the peak differentials in temperature exhibited between diametrically opposed sensors of said arrays; and
    (e) determining groundwater flow as a linear function of the maximum peak differential measured in step (d).

20. The method as defined in claim 19 including the step of orienting the array, in step (b), such that the azimuths of diametrically opposed pairs of sensors is known and including the additionally step of determining groundwater flow direction in step (e).

* * * * *